(12) United States Patent
Barsun et al.

(10) Patent No.: US 7,453,701 B2
(45) Date of Patent: Nov. 18, 2008

(54) COMPUTER SYSTEM WITH MOVABLE CARD GUIDE

(75) Inventors: Stephan K. Barsun, Davis, CA (US); Robert W. Dobbs, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 85 days.

(21) Appl. No.: 11/205,715

(22) Filed: Aug. 17, 2005

(65) Prior Publication Data

US 2005/0277311 A1 Dec. 15, 2005

Related U.S. Application Data

(63) Continuation of application No. 10/459,275, filed on Jun. 11, 2003, now Pat. No. 6,967,847.

(51) Int. Cl.
H05K 5/00 (2006.01)
H05K 5/04 (2006.01)
H05K 5/06 (2006.01)

(52) U.S. Cl. .................. 361/752; 361/753; 361/801
(58) Field of Classification Search .............. 361/788, 361/796–802, 752–753
See application file for complete search history.

(56) References Cited

U.S. PATENT DOCUMENTS

| | | | |
|---|---|---|---|
| 4,064,551 A | 12/1977 | Lightfoot | |
| 4,151,580 A | 4/1979 | Struger et al. | |
| 4,197,572 A | 4/1980 | Aimar | |
| 4,313,150 A | 1/1982 | Chu | |
| 5,373,419 A | 12/1994 | Wright | |
| 5,386,346 A * | 1/1995 | Gleadall | 361/799 |
| 5,414,594 A | 5/1995 | Hristake | |
| 5,442,520 A | 8/1995 | Kemp et al. | |
| 5,629,836 A | 5/1997 | Wright | |
| 5,657,204 A * | 8/1997 | Hunt | 361/752 |
| 5,673,175 A | 9/1997 | Carney et al. | |
| 5,774,337 A | 6/1998 | Lee et al. | |
| 5,774,343 A | 6/1998 | Benson et al. | |
| 6,088,232 A | 7/2000 | Ho | |
| 6,097,591 A | 8/2000 | Ircha | |
| 6,128,196 A | 10/2000 | Hoyle, Jr. et al. | |
| 6,201,705 B1 | 3/2001 | Nygren et al. | |
| 6,269,006 B1 * | 7/2001 | Treiber et al. | 361/756 |
| 6,292,361 B1 * | 9/2001 | Johnson et al. | 361/687 |
| 6,304,456 B1 | 10/2001 | Wortman | |
| 6,341,063 B2 | 1/2002 | Kinoshita et al. | |
| 6,362,968 B1 | 3/2002 | Lajara et al. | |
| 6,373,712 B1 | 4/2002 | Bailis et al. | |
| 6,385,053 B1 | 5/2002 | Parizi et al. | |
| 6,411,517 B1 | 6/2002 | Babin | |
| 6,437,988 B1 | 8/2002 | Treiber et al. | |
| 6,480,391 B1 | 11/2002 | Monson et al. | |
| 6,498,730 B2 | 12/2002 | Centola et al. | |
| 6,498,731 B1 | 12/2002 | Roscoe et al. | |
| 6,522,554 B1 | 2/2003 | Gomez et al. | |
| 6,618,260 B2 | 9/2003 | Willis et al. | |

* cited by examiner

Primary Examiner—Tuan T Dinh

(57) ABSTRACT

A computer system includes a chassis, a first printed circuit board having a surface facing the cavity and at least one component extending from the surface. The printed circuit board linearly moves between a first position in which the at least one component is at least partially received within the cavity and a second position in which the at least one component is removed from the cavity.

22 Claims, 4 Drawing Sheets

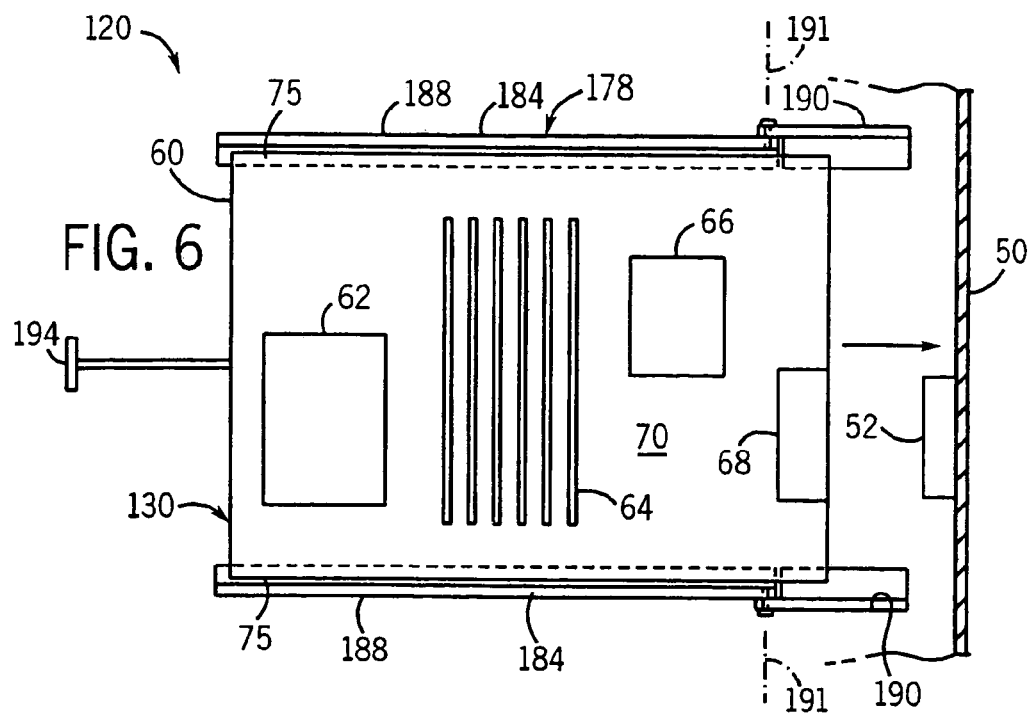
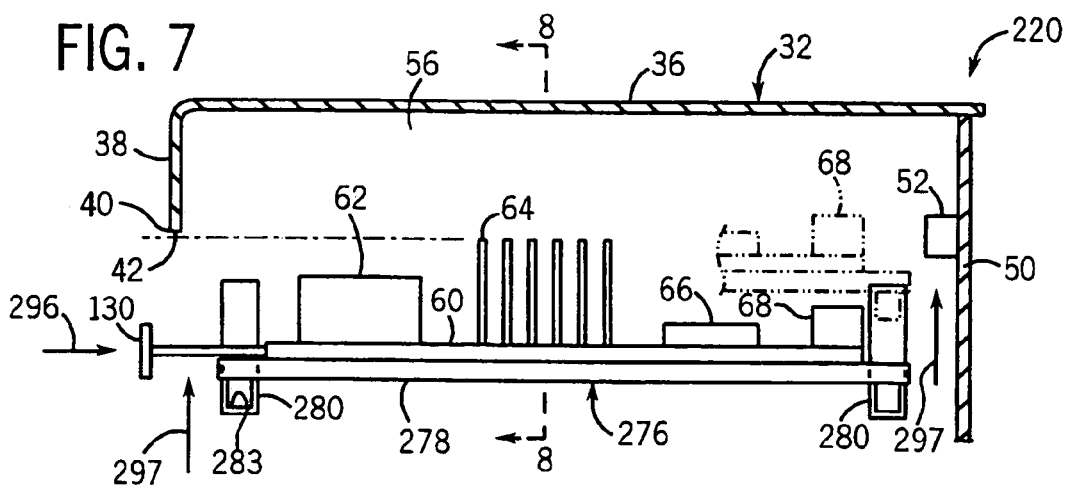
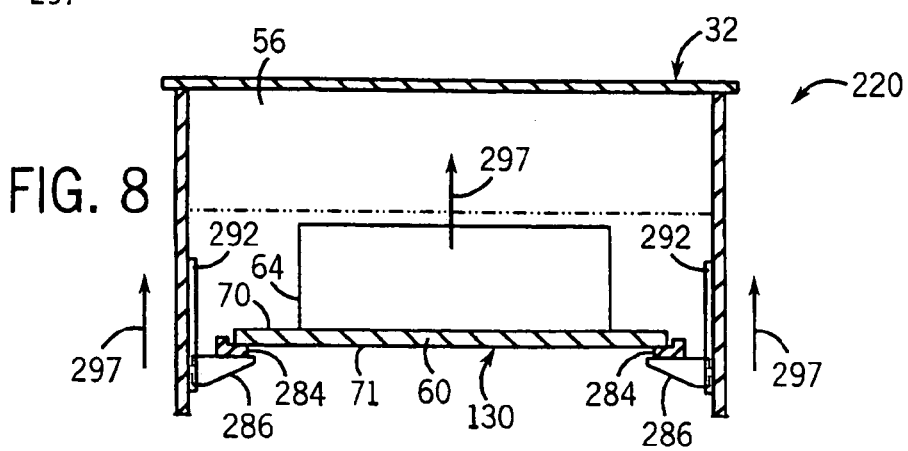

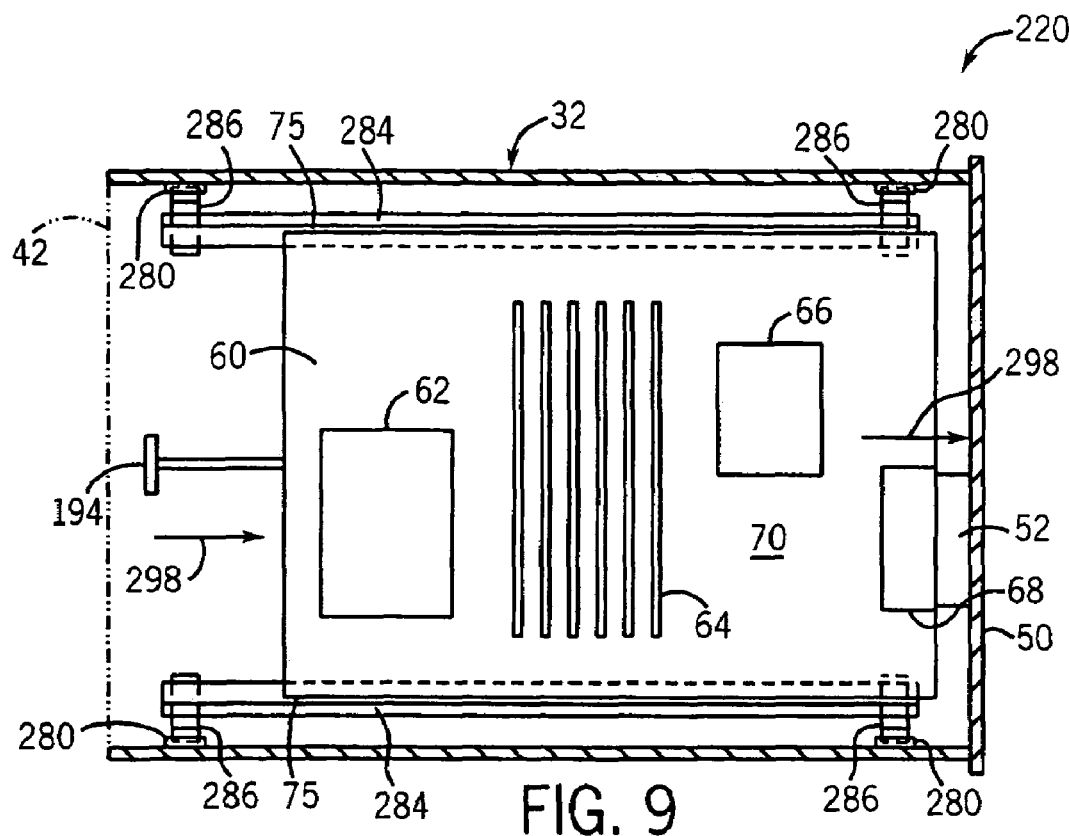
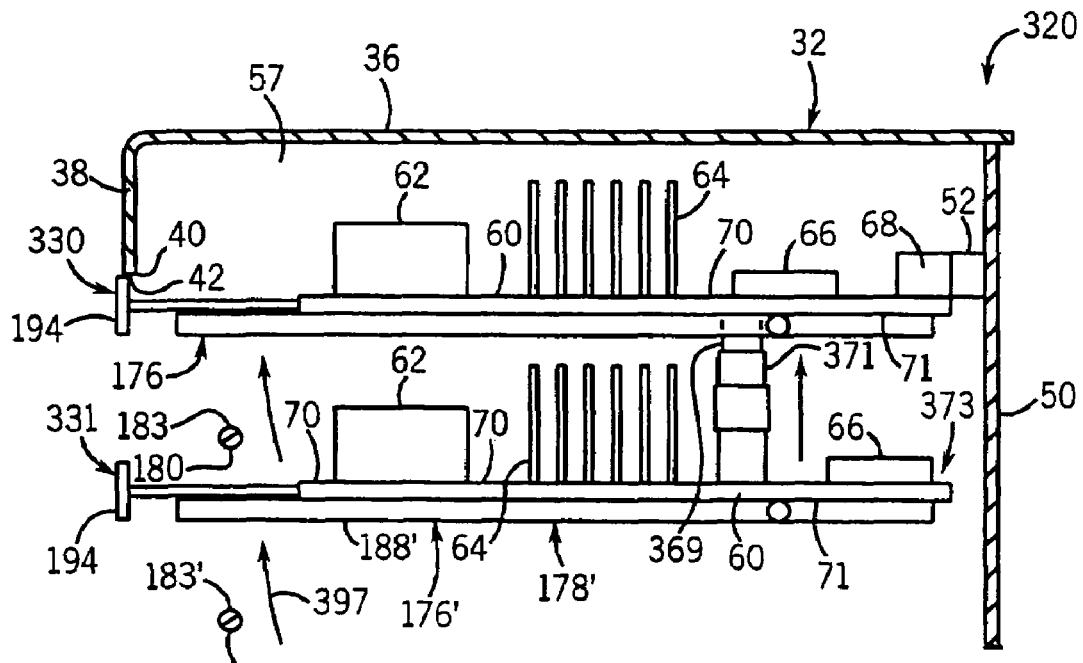

COMPUTER SYSTEM WITH MOVABLE CARD GUIDE

The present application is a continuation application claiming priority under 35 U.S.C. § 120 from co-pending U.S. patent application Ser. No. 10/459,275 filed on Jun. 11, 2003 by Stephan K. Barsun and Robert W. Dobbs and entitled "Computer System With Movable Card Guide", the full disclosure of which is hereby incorporated by reference.

BACKGROUND

Many computer systems include removable circuit board assemblies or cards housed or enclosed in a chassis and interconnected to a common backplane. In some systems, the chassis includes a card cage which comprises a permanent structure into which cards are supported adjacent one another. In other systems, the chassis includes a removable card cage which supports a plurality of cards within a single unit or module, wherein insertion of the card cage into the rest of the chassis results in connection of each card to a common backplane.

In most systems, the chassis or card cage portion of the chassis is formed from relatively thin lightweight material, such as sheet metal. To provide adequate strength to the chassis and to prevent deformation of the chassis during assembly, transport or use, the sheet metal or other material forming walls of the chassis are commonly bent or deformed along edges of the walls of the chassis to increase the strength of the walls. Unfortunately, such bending of the walls of the chassis creates cavities which are difficult to fill with internal components of the computer such as removable cards. As a result, the interior of such cavities is unutilized and constitutes wasted dead space.

BRIEF DESCRIPTION OF THE DRAWINGS

FIG. 6 is a top plane view schematically illustrating the computer system of FIG. 3 with the card in a disconnected state.

FIG. 7 is a sectional view of a second alternative embodiment of the computer system of FIG. 1 with a removable card in a loading/unloading position and a cavity filling position shown in phantom.

FIG. 8 is a sectional view of the computer system of FIG. 7 taken along line 8-8.

FIG. 9 is a top plane view schematically illustrating the computer system of FIG. 7 illustrating the card in a cavity filling position and in a connected state.

FIG. 10 is a sectional view schematically illustrating a third alternative embodiment of the computer system of FIG. 1 with a first removable card in a cavity filling position and in a connected state and with a second removable card in a raised connected state.

DETAILED DESCRIPTION OF THE EXAMPLE EMBODIMENTS

Figure 1:
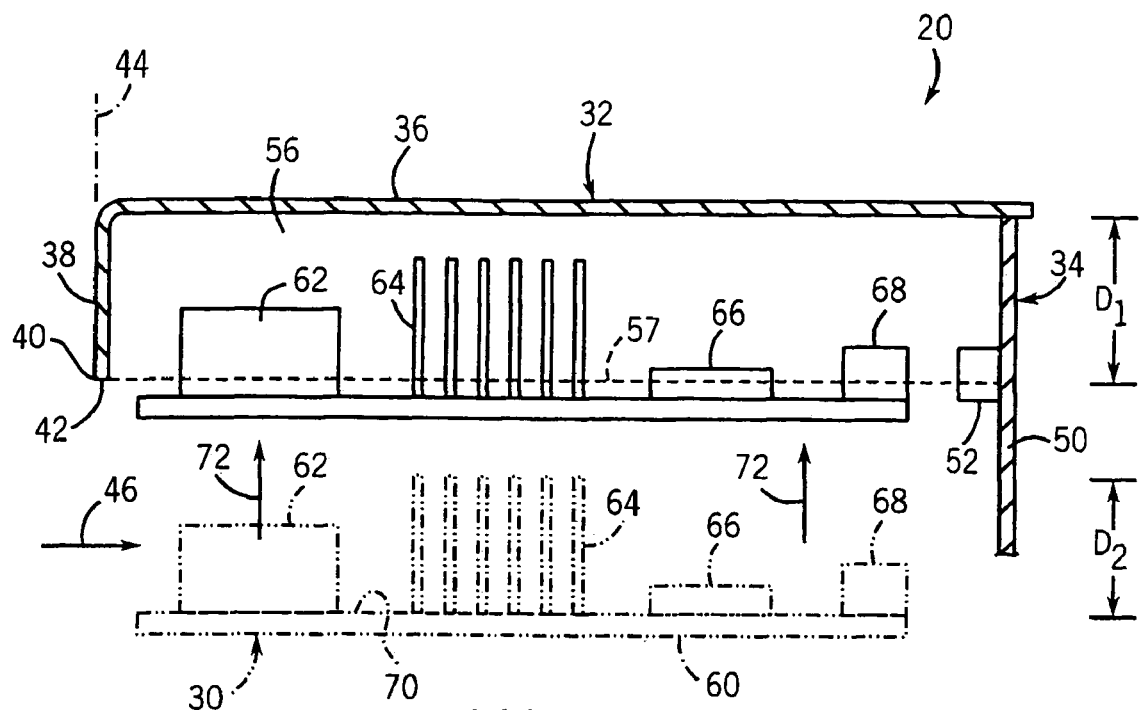
FIG. 1 is a sectional view schematically illustrating a computer system with a removable card illustrated in a loading/unloading position shown in phantom and a cavity filling position shown in solid lines.
Figure 2:
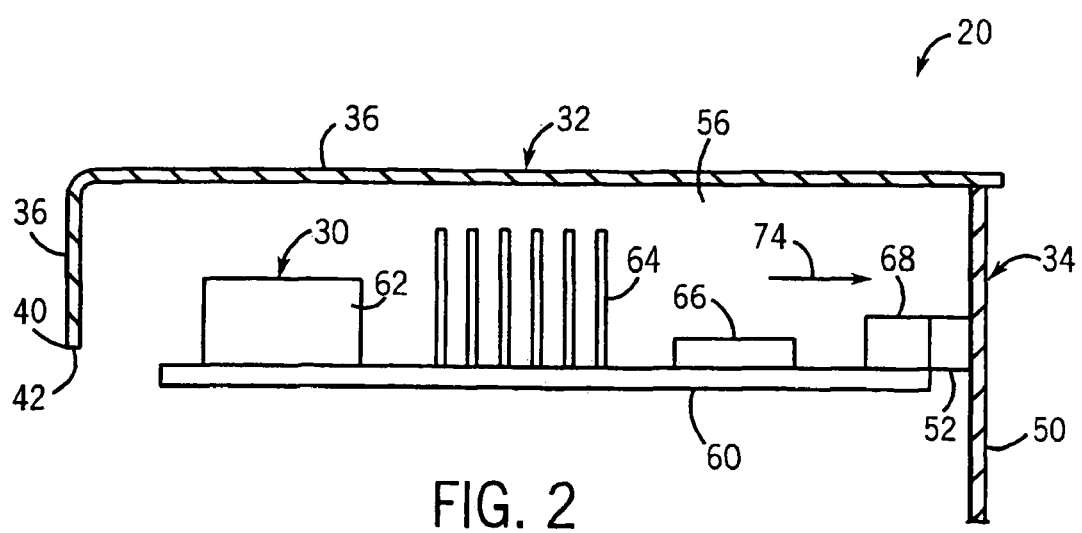
FIG. 2 is a sectional view schematically illustrating the computer system of FIG. 1 with the removable card moved to a connected state.

FIGS. 1 and 2 illustrate electronic or computer system 20 and a method for providing computer system 20 with a removable card 30. For ease of illustration, only portions of computer system 20 are shown. As shown by FIG. 1, computer system 20 generally includes a chassis 32 and a backplane 34. Chassis 32 comprises one or more structures configured to support and house major system components of system 20 such as backplane 34 and card 30. In particular applications in which computer system 20 includes a plurality of removable cards similar to card 30, chassis 32 may provide a designated area, known as a card cage, for supporting a plurality of cards 30 parallel with one another. In some applications, a portion of chassis 32 forms a card cage configured to be separable from remaining portions of chassis 32, enabling the system to be configured in different ways. For purposes of this disclosure, the term "chassis" includes chassis having a removable card cage portion or a permanent, stationary card cage portion.

Chassis 32 includes a plurality of walls 36, 38 and others to form an enclosure for computer system 20. As shown by FIGS. 1 and 2, wall 38 extends perpendicular to wall 36 and has an end portion 40 which forms or defines an opening 42 which generally extends within a plane 44. Opening 42 is generally sized to permit card 30 to be inserted through opening 42 in a direction perpendicular to plane 44 as indicated by arrow 46.

Backplane 34 comprises a printed circuit assembly including printed circuit board 50 and connector 52. Printed circuit board 50 is supported within chassis 32 so as to extend opposite wall 38. In the particular embodiment illustrated, printed circuit board 50 extends parallel to wall 38. In alternative embodiments, printed circuit board 50 may be supported at other angles relative to wall 38. As a result, printed circuit board 50 and chassis 32 form a cavity 56.

Cavity 56 generally constitutes the volume or space in the interior of chassis 32 adjacent to the wall of chassis 32 that at least partially defines opening 42 and that generally extends within a plane contiguous with the plane of the opening 42 (in this case, wall 38 extending within plane 44). As shown by dashed or broker lines in FIG. 1, cavity 56 is bounded by an imaginery plane 57 extending from end portion 40 of the wall 38 perpendicular to the plane in which wall 38 and opening 42 extend (plane 44). Cavity 56 has a depth D1 of at least about 5 inches. Although the value of utilizing such space may be lessened, cavity 56 may alternatively have a smaller depth. Although cavity 56 is illustrated as being partially bounded by backplane 34, cavity 56 may alternatively be bounded by internal system components or by additional walls of chassis 32 itself. In previous computer systems, cavity 56 was not utilized and simply constituted wasted or dead space. In contrast, computer system 20 and the method described herein enable cavity 56 to be utilized, enabling higher density product design for smaller computer systems with less weight and less material.

Removable card 30 includes printed circuit board 60, card supported devices or components 62, 64, 66 and connector 68. Card 30 may include additional components which are not generally shown for ease of illustration. For purposes of this disclosure, the term "printed circuit board" encompasses any trays, frames, brackets or other stiffening or supporting members extending along or adjacent to the rest of the printed circuit board which generally includes one or more layers of material extending about or containing data transmission lines such as electrically conductive traces. Components 62, 64 and 66 are coupled to surface 70 of printed circuit board 60 which faces cavity 56. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Components 62 and 66 are generally permanently affixed to surface 70 and comprise conventionally known or future developed active or passive components. Components 64 comprise secondary cards removably coupled to connected to printed circuit board 60 via a connectors. In the particular embodiment illustrated, components 64 comprise a plurality of parallel memory cards such as dual inline memory modules, or DIMMS. Of components 62, 64 and 66 coupled to printed circuit board 60, components 64 extend from surface 70 by the greatest distance. In the particular embodiment, at least one of components 62, 64 and 66 extends from surface 70 by a distance D2. In the particular embodiment illustrated, components 64 extend from surface 70 by a height D2 of about 1 to 5 inches.

Connector 68 comprises a conventionally known or future developed connector affixed to printed circuit board 60 and configured to connect to connector 52 of backplane 34. In the particular embodiment illustrated, connectors 52 and 68 comprise high density pin connectors. Various other forms of connectors may alternatively be employed. In still other embodiments, connectors 68 may be omitted wherein backplane 34 is also omitted or wherein card 30 is not connected to backplane 34.

To assemble card 30 as part of computer system 20, card 30 is at least partially passed through opening 42 in a general direction as indicated by arrow 46. Once card 30 is sufficiently positioned within the interior of computer system 20 adjacent to cavity 56, card 30 is then moved generally in the direction indicated by arrows 72 to a cavity filling position (shown in solid lines in FIG. 1) in which at least one of components 62, 64 and 66 partially projects into cavity 56 or in which the entirety of card 30 resides in cavity 56. Although arrows 72 indicate linear movement of card 30 to the cavity filling position, card 30 may alternatively be pivoted about an axis into the cavity filling position shown.

In the embodiment shown in which backplane 34 and card 30 include complementary connectors 52 and 68, connectors 68 faces connector 52 when card 30 is in the cavity filling position. As shown by FIG. 2, card 30 is then moved in a direction perpendicular to plane 44 and generally parallel to the direction indicated by arrow 46 as indicated by arrow 74. Such movement generally continues until connector 68 is brought into connecting engagement with connector 52. Once card 30 has been moved to the cavity filling position and once connector 68 has been moved into connecting engagement with connector 52 (in those applications that have such connectors), card 30 is releasably retained in the cavity filling position. To remove card 30 from computer system 20 generally requires that the above steps be performed in reverse order.

FIGS. 3-6 illustrate computer system 120, a first alternative embodiment of computer system 20 shown in FIGS. 1 and 2, and a process of assembling a removable card 130 to the remainder of computer system 120. Computer system 120 is substantially identical to computer system 20 except that computer system 120 includes card 130 in lieu of card 30 and additionally includes card moving system 176. Card 130 is substantially identical to card 30 shown and described with respect to FIGS. 1 and 2 except that card 130 additionally includes bulkhead 194. Bulkhead 194 comprises a structure affixed or otherwise coupled to printed circuit board 60. Bulkhead 194 is generally configured to serve as a grip or handle for facilitating insertion or removal of card 130. Additionally, bulkhead 194 may provide mounting for connectors to connect input/output cables and the like. Alternatively, card 130 may have a longer length and bulkhead 194 may extend adjacent to and along the edge 195 of card 130.

Card moving system 176 generally comprises a mechanism configured to support card 130 as card 130 is moved to the cavity filling position. Card moving system 176 is also additionally configured to removably retain card 130 in the card filling position and to control movement of card 130 during removal of card 30 from computer system 120. In the embodiment illustrated in which computer system 120 includes backplane 34 having connector 52 and in which card 130 has connector 68, system 176 is additionally configured to support card 130 as card 130 moved to bring connectors 68 and 52 into connecting engagement with one another.

Figure 5:
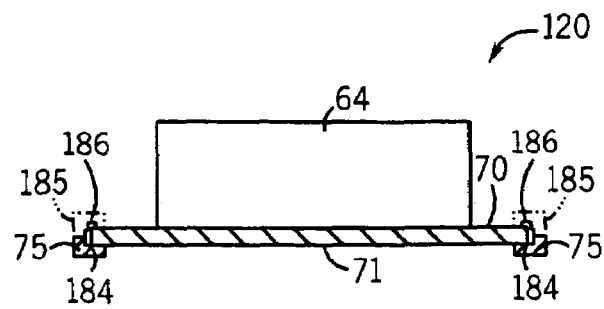
FIG. 5 is a sectional view of the computer system of FIG. 3 taken along line 5-5.

Card moving system 176 includes guide 178, stop 180 and catch 182. Guide 178 comprises one or more structures coupled to chassis 32 and configured to support card 130 as card 130 is moved to the cavity filling position. As shown by FIG. 5, guide 178 includes a pair of opposite rails 184 which engage and support opposite side edges 75 of circuit board 30. Rails 194 continuously extend along opposite edges 75 of circuit board 30 as shown or may alternatively intermittently engage opposite side edges 75 of printed circuit board 60. As shown by broken lines in FIG. 5, portions of rails 194 may alternatively be configured to additionally include top portions 185 that form grooves 186 which receive opposite edges 75 such that portions of guide 178 extend completely about edges 75 to provide greater control of the movement of printed circuit board 30.

Figure 3:
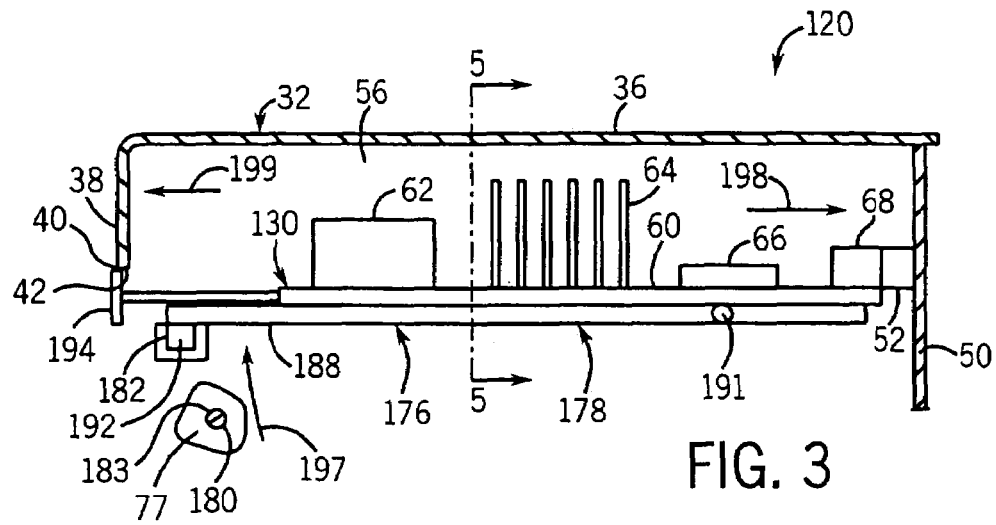
FIG. 3 is a sectional view schematically illustrating a first alternative embodiment of the computer system of FIG. 1 with a removable card in a cavity filling position and in a connected state.
Figure 4:
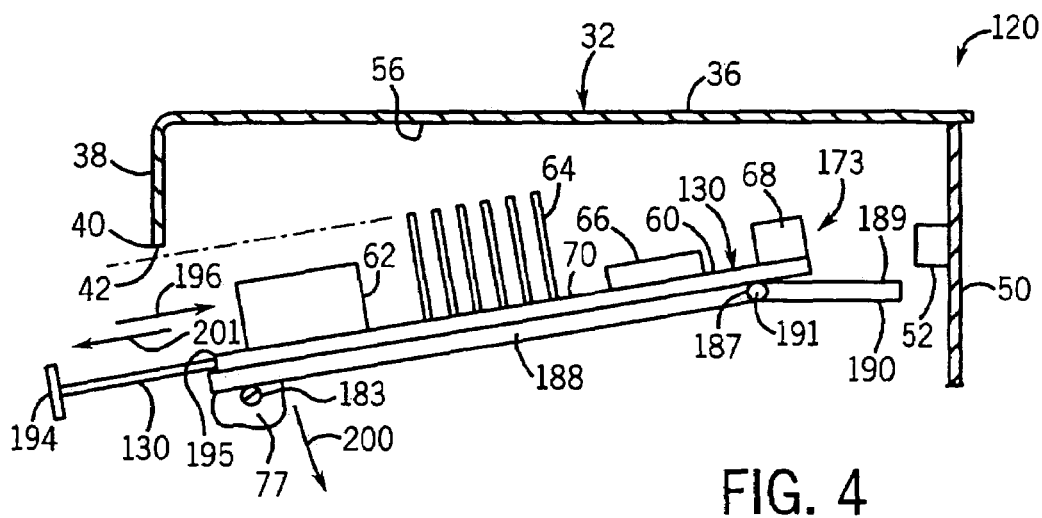
FIG. 4 is a sectional view schematically illustrating the computer system of FIG. 3 with the removable card in a disconnected state and in a loading/unloading position.

As best shown by FIGS. 3, 4 and 6, at least a portion of guide 178 is pivotably coupled to chassis 32 for pivotal movement relative to chassis 32. In the particular embodiment illustrated, guide 178 includes a pivoting portion 188 and a fixed or stationary portion 190. Pivoting portion 188 is pivotably supported about axis 191 relative to chassis 32. Rails 184 of pivoting portion 188 are connected to one another by one or more intermediate structures extending between the opposite rails 184 such that rails 184 of portion 188 pivot about axis 191 in unison. In one embodiment, opposite rails 184 are connected by sleeve 187 which serves as an axle for the pivotal movement of pivoting portion 188 about axis 191. In the embodiment illustrated, axis 191 is generally a horizontal axis such that gravity assists pivoting portion 188 about axis 191. In alternative embodiments, axis 191 may be vertical depending upon the configuration of computer system 120.

Stationary portion 190 of guide 178 comprises that portion of guide 178 configured to guide movement of card 30 so as to bring connectors 68 and 52 into engagement with one another. Stationary portion 190 generally extends between axis 191 and connector 52. To enable insertion of card 130 through opening 42, stationary portion 190 does not include top portion 185. In the particular embodiment illustrated, opposite rails 184 of stationary portion 190 converge together towards connector 52 to lead in or guide connector 68 into proper alignment with connector 52. In alternative embodiments, pivoting portion 98 of guide 178 have opposite converging rails 184 to facilitate alignment of connectors 68 and 52. In other embodiments, rails 184 of guide 178 may be parallel and may be provided with close tolerances to facilitate proper alignment of connectors 68 and 52 without any converging rails. Although stationary portion 190 is illustrated as continuously extending from axis 191, stationary portion 190 may be spaced from axis 191 and may include a plurality of intermittently spaced portions between axis 191 and connector 52. In still other embodiments, stationary portion 190 and guide 178 may be omitted such that portions of card 30 bridge between axis 191 and connector 52. In yet still other embodiments in which connectors 52 and 68 are omitted, the entirety of guide 178 may be pivotally supported relative to chassis 32 and may be pivotally supported adjacent to the wall opposite opening 42.

Stop 180 comprises a structure coupled to wall 97 of chassis 32 (or another internal wall in chassis 32) and is configured to engage pivoting portion 188 of guide 178 when pivoting portion 188 is pivoted to the unloading/loading position shown in FIG. 4. In particular, stop 180 provides a stop surface 83 that abuts the lower surface of at least one of rails 184. Stop surface 183 is located relative to end portion 40 of wall 38 such that card 130, including its tallest components 62, 64 and 66, slides along pivoting portion 188 and through opening 42. At the same time, stop surface 183 is located to prevent unlimited pivoting of pivoting portion 188 about axis 191 to avoid contact with components on opposite side of printed circuit board 60 as compared to components 62, 64 and 66.

Catch 182 generally comprises a mechanism configured to releasably retain card 130 in the cavity filling position. In one embodiment, catch 182 is configured to extend between chassis 32 and pivoting portion 188 of guide 178 to retain pivoting portion 188 in a raised position such that card 130 is retained in the cavity filling position. In one embodiment, catch 182 comprises a resiliently flexible tab or prong 192 which is angled outwardly above pivoting portion 188 of guide 178. During lifting of pivoting portion 188, pivoting portion 188 engages catch 182 such that the tab or prong 192 resiliently flexes away from pivoting portion 188 to permit pivoting portion 188 to be moved past prong 192. Once pivoting portion 188 has been moved past prong 192, prong 192 resiliently returns to its initial position in which the prong or hook 192 engages an underside of pivoting portion 188 to retain pivoting portion 188 in the raised position. To lower pivoting portion 188, the resiliently flexible prong 192 extending from chassis 32 is resiliently bent to permit pivoting portion 188 to move past prong 192 so that pivoting portion 188 may be lowered or pivoted into engagement with stop surface 183. In alternative embodiments, other conventionally known or future developed catching or latching mechanisms may be employed to releasably retain pivoting portion 188 of guide 178 in a raised position. In still other embodiments, catch 182 may be omitted where the very end portion 189 of stationary portion 190 includes top portion 185 such that card 130, itself, retains pivoting portion 188 in the raised, cavity filling position.

Although system 120 is illustrated as including one particular stop 180 and one particular catch 182, various other stops and catches may be employed. For example, in lieu of extending between chassis 32 and pivoting portion 188, catch 182 may alternatively extend between chassis 32 and card 130. As shown by FIG. 3, card 130 includes an optional bulkhead 194 adhered to printed circuit board 60. Bulkhead 194 may additionally be configured to facilitate the retention of card 70 in the cavity filling position. In particular, catch 182 may alternatively comprise a hook, latch or other mechanism coupled to chassis 32 and configured to engage a corresponding notch, detent or other complementary engaging structure coupled to or formed with bulkhead 194.

In still other embodiments, one or both of stop 180 and catch 182 may alternatively be incorporated into axle 187. In particular, axle 187 may be configured to limit the rotation of pivoting portion 188 about axis 191. Likewise, axle 187 may also be configured to include a releasable locking mechanism configured to lock axle 187 relative to chassis 32 when pivoting portion 188 is raised and when card 130 is in the cavity filling position. In still another embodiment, catch 182 may alternatively comprise a rigid bar slidable between a first position in which the bar is entirely retained in one of pivoting portions 188 and 190 of guide 178 and a second position in which the bar spans across both portions 180 and 190 to retain portions 188 and 190 in a single plane when pivoting portion 188 and card 70 are in the cavity filling position. These and other alternative embodiments are contemplated within the present disclosure.

FIGS. 3, 4 and 6 illustrate the process of inserting card 130 into computer system 120. As indicated by arrow 196 in FIG. 4, the forward end portion 173 of card 130 is inserted through opening 42 onto pivoting portion 188 of guide 178. Thereafter, card 130 is moved along pivoting portion 188 of guide 178 in the direction indicated by arrow 196. Card 130 is pushed along pivoting portion 188 until all of components 62, 64 and 66 pass through opening 42. As shown by FIG. 3, pivoting portion 188 is then pivoted about axis 191 in the direction indicated by arrow 197 until card 130 reaches the cavity filling position in which connector 68 faces connector 52. In the particular embodiment illustrated in FIG. 3, the card filling position occurs when printed circuit board 60 of card 130 extends along a substantially horizontal plane. When pivoting portion 188 and card 130 are in the cavity filling position, catch 182 is in engagement with pivoting portion 188 to retain pivoting portion 188 and card 130 in place. Thereafter, card 130 is further moved in the direction indicated by arrow 198 until connector 68 is brought into connecting engagement with connector 52.

The removal of card 130 requires that the aforementioned steps be reversed. In particular, card 130 is first moved in the direction indicated by arrow 199 to disconnect connectors 68 and 52. Movement of card 130 in the direction indicated by arrow 199 is limited by component 62 and wall 38 of chassis 32. Catch 182 is then disengaged from pivoting portion 188 to permit pivoting portion 188 to pivot in the direction indicated by arrow 200 (shown in FIG. 4). After pivoting portion 188 is pivoted about axis 191 into engagement with stop surface 183, card 130 is further moved relative to pivoting portion 188 in the direction indicated by arrow 201. Card 130 is pulled through opening 42 and out of engagement with guide 187. Guide 187 is now empty and ready for insertion of another card.

FIGS. 7-9 illustrate computer system 220, a second alternative embodiment of system 20, and a process for assembling card 130 as part of system 220. System 220 is substantially identical to system 120 shown in FIGS. 3-6, except that system 120 includes card moving system 276 in lieu of card moving mechanism 176. Card moving system 276 comprises a mechanism configured to support and guide movement of card 130 to the cavity filling position. System 276 generally includes guide 278 and tracks 280. Guides 278 support card 130 during movement of card 130 to the cavity filling position. In the particular embodiment illustrated in which computer system 220 includes connector 52 and card 130 includes connector 68, guide 278 further guides movement of card 130 between a connected state in which connectors 68 and 52 are connected and a disconnected state. Guide 278 includes opposite rails 284 and rail supports 286. Rails 284 extend along opposite edges of printed circuit board 60. In the particular embodiment illustrated in which rails 284 extend in a horizontal plane, rails 284 are configured to extend below opposite edges of printed circuit board 60 to support printed circuit board 60. In alternative embodiments in which rails 284 extend in a vertical plane, rails 284 may additionally include portions 185 (illustrated in FIG. 5) so as to form a groove or channel 186 which receives the side edges of printed circuit board 60. In alternative embodiments in which rails 284 extend in a horizontal plane, rails 284 may also additionally include portions 185 (shown in FIG. 5) to provide more controlled movement of card 30. In addition to supporting card 130, rails 284 are additionally configured to facilitate sliding of card 60 along rails 284 to guide movement of card 130 between the connected and disconnected state.

Rail supports 286 comprise structures coupled to rails 284 and interacting or cooperating with tracks 280 to movably support rails 284 relative to chassis 32. In the particular embodiment illustrated, rail supports 286 are connected to one another by cross braces, cross members or the like such that rail supports 286 move in unison. As best shown by FIG. 9, rail supports 286 are spaced along each of rails 284 and are slidably connected to corresponding tracks 280.

Tracks 280 generally comprise structures coupled to chassis 32 and configured to guide vertical movement of rail supports 286. In alternative embodiments in which printed circuit board 60 of card 130 extends in a vertical plane, tracks 280 and rail supports 286 will alternatively move in a generally horizontal plane. In the particular embodiment illustrated, each of tracks 280 generally comprises a member, formed out of a material such as polymer, having a pair of opposite inwardly facing grooves or channels. Each of rail supports 286 includes a generally T-shaped tongue slidably received and captured within the grooves to facilitate sliding movement of rail supports 286 along tracks 280. In alternative embodiments, this relationship may be reversed wherein tracks 280 include a tongue while rail supports 286 include a groove. In still other embodiments, the pair of opposite inwardly facing grooves may be replaced with a pair of opposite outwardly facing grooves wherein the tongue would be replaced with a pair of inwardly extending tongues or tabs which are slidably received within the grooves. In particular embodiments, additional items such as lubricants or bearings may be employed to facilitate such sliding movement. In the aforementioned structures, various other conventionally known or future developed mechanical arrangements may be employed to slidably support rail supports 286 along tracks 280. In alternative embodiments, in lieu of being attached or mounted to chassis 32, tracks 280 may alternatively be integrally formed as part of a single unitary body with chassis 32.

In addition to guiding movement of rail supports 280, rails 284 and ultimately card 130, tracks 280 may also function as a stop and/or a catch. As shown by FIG. 7, each of tracks 280 has a lower end providing a stop surface 283 which limits movement of rail supports 286. As shown by FIG. 8, tracks 280 may additionally include at least one resiliently flexible prong 292 extending inwardly from chassis 32 configured to resiliently engage rail supports 286. In particular, during movement of rail supports 286 past prongs 292, prongs 292 resiliently flex outwardly. Once rail supports 286 are past prongs 292, prongs 292 return to the original position into engagement with an underside of rail supports 286 to supports 286, rails 284 and card 130 in the cavity filling position.

The lowering of rail supports 286 along tracks 280 may be achieved by flexing prongs 292 towards chassis 32 to permit rail supports 286 to pass by prongs 292. To facilitate easy manipulation of prongs 292, two or fewer prongs 292 are utilized. In alternative embodiments, stop 180 and catch 182 may be utilized. In such embodiments, catch 182 would engage either rails 284 or rail supports 286. Likewise, stop 180 would engage either rails 284 or rail supports 286. In lieu of utilizing flexible prongs, alternative embodiments may use spring-loaded prongs.

FIGS. 7-9 illustrate a process of inserting card 130 when assembling card 130 as part of computer system 220. As shown by FIG. 7, card 130 is initially inserted through opening 42 and positioned upon rails 284 of guide 278. Card 130 is moved in the direction indicated by arrow 296 until each of components 62, 64 and 66, and printed circuit board 60 are positioned opposite cavity 56. Thereafter, guide 278 is moved in the direction indicated by arrows 297 until board 130 is in the cavity filling position and which at least one of components 62, 64 and 66 at least partially projects into cavity 56. As shown by FIG. 9, in those embodiments in which computer system 120 includes connectors 52 and 68, board 30 is further moved along rails 284 in the direction indicated by arrows 298 until connector 68 is brought into connecting engagement with connector 52. Although FIG. 9 illustrates printed circuit board 60 as being shorter than the length of rails 284, the printed circuit board system may alternatively have a length greater than that of rails 284.

FIG. 10 illustrates computer system 320, a third alternative embodiment of computer system 20, and a process for assembling multiple removable cards as part of system 320. System 320 is substantially identical to system 120 shown in FIGS. 3-6 except that system 320 includes cards 330 and 331 and that computer system 320 includes two card moving systems 176 and 176 in lieu of a single card moving system 176. For ease of illustration, those remaining elements of system 320 which correspond to elements of system 120 are numbered similarly. Card 330 is substantially identical to card 130 except that card 330 additionally includes connector 369. Card 331 is substantially identical to card 130 except that card 331 additionally includes connector 371.

Connector 369 comprises a conventionally known or future developed connector configured to interact with connector 371 for transmitting data signals to connector 371. In the particular embodiment illustrated, connector 369 comprises a high density pin connector. Connector 369 extends from surface 71 of printed circuit board 60 of card 330 in a direction away from surface 71.

Connector 371 comprises a conventionally known or future developed connector configured to connect or interact with connector 369 to transmit data signals to connector 369. In the particular embodiment illustrated, connector 371 comprises a portion of a high density pin connector. Connector 371 extends from surface 70 of printed circuit board 60 of card 331 and is located so as to extend generally opposite connector 369 when card 331 is a raised position as shown.

FIG. 10 further illustrates a process of assembling cards 330 and 331 are part of computer system 320. In particular, card 330 is assembled as part of computer system 320 in a fashion substantially identical to assembling of card 130 as shown and described with respect to FIGS. 3-6. Unlike card 130, card 331 omits a connector 68. Forward end 373 is inserted through opening 42 onto pivoting portion 188 of guide 178'. While pivoting portion 188' is in a lowered position resting upon stop surface 183', card 331 is then inserted further through opening 42 by pushing card 331 along pivoting portion 188' until each of components 62, 64, and 66 have passed through opening 42 and are opposite card 330. Thereafter, pivoting portion 188' is pivoted in the direction indicated by arrow 397 until connector 371 is brought into connecting engagement with connector 369. Although not illustrated, card 330 is releasably retained in the cavity filling position shown by a catch 182. Similarly, card 331 is releasably retained in a raised position in which connectors 369 and 37.1 are in engagement by another catch substantially identical to catch 182 but configured to engage pivoting portion 188'.

Although computer system 320 is illustrated as including two card moving systems 176 and 176' which move cards 330 and 331, respectively, computer system 320 may alternatively utilize a combination of card moving system 176 and card moving system 276 to assemble multiple cards into and as part of computer system 320. For example, card 331 may alternatively be moved by card moving system 276, wherein card 331 is moved to a raised position in which connectors 369 and 371 are brought into connecting engagement. In another embodiment, card 330 may be moved to the cavity filling position by card moving system 276 while card 331 is moved to the raised connecting state by card moving system 176'. In still other embodiments, printed circuit board 60 of card 331 may be positioned in closer proximity to printed circuit board 60 of card 330, wherein at least some of the tallest of components 62, 64, 66 and 68 alternatively extend from surface 71 of printed circuit board 60 of card 331. In such alternative embodiments, connector 371 may have a reduced height or may be configured so as to extend away from surface 70 by a lesser extent. In still other embodiments, system 320 may be modified to omit backplane 34 such that connector 68 may also be omitted.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A computer system comprising:
   a chassis having a cavity;
   a first printed circuit board having a first surface facing the cavity; and
   at least one component extending from the first surface, wherein the first printed circuit board moves between a first position in which the at least one component is at least partially received within the cavity and a second position in which the at least one component is removed from the cavity, wherein the first printed circuit board linearly translates between the first position and the second position along a first line in a first direction;
   a guide supporting the first printed circuit board, wherein the guide linearly translates in the first direction, wherein the guide is configured to guide movement of the first printed circuit board in a second direction perpendicular to the first direction;
   a first connector affixed to the first printed circuit board;
   a second printed circuit board; and
   a second connector affixed to the second printed circuit board and facing the first connector when the first printed circuit board is in the first position, wherein the guide guides movement of the first connector in the second direction into engagement with a second connector.

2. The system of claim 1, wherein the chassis includes at least one track extending in the first direction, wherein the guide moves along the track.

3. The system of claim 1, wherein the first printed circuit board and the second printed circuit board extend perpendicular to one another when the first connector and the second connector are in engagement.

4. The system of claim 1, wherein the cavity has a depth of at least 5 inches.

5. The system of claim 1, wherein the at least one component extends from the first printed circuit board by a distance of at least 1 to 5 inches.

6. The system of claim 1, wherein the at least one component includes a secondary card.

7. The system of claim 1, wherein the guide engages opposite sides of the first printed circuit board.

8. The system of claim 1, wherein the guide forms opposing channels which slidably and removably receive opposing edges of the first printed circuit board.

9. The system of claim 1, wherein at least a portion of the guide is movable relative to the cavity.

10. The system of claim 1 including a bulkhead coupled to the first printed circuit board.

11. The system of claim 1 including a catch configured to releasably retain the first printed circuit board in the first position.

12. The system of claim 6, wherein the at least one secondary card includes at least one memory card.

13. The system of claim 9 including a stop surface configured to engage the guide to limit movement of the guide away from the cavity.

14. The system of claim 8, wherein substantially an entirety of the guide linearly translates in the first direction.

15. A method comprising:
   inserting a card having a printed circuit board and at least one component extending from the printed circuit board in a first direction into a chassis through an opening facing in the first direction, wherein the chassis at least partially forms a cavity having a volume extending in a plane parallel to the first direction and surrounded on all sides, the cavity having an opening facing in a second direction perpendicular to the first direction;
   linearly translating the card with a guide that supports the card and guides movement of the card in a second direction perpendicular to the first direction to a cavity filling position in which the at least one component intersects the plane and at least partially extends within the cavity;
   moving the card in a first direction by linearly translating the guide while the guide supports the card after the card has been moved to the cavity filling position; and
   retaining the card in the cavity filling position.

16. The method of claim 15, wherein the first printed circuit board includes a first connector and wherein the chassis houses a second printed circuit board and a second connector affixed to the second printed circuit board, wherein the card is moved in the first direction after the card is in the cavity filling position to connect the first connector to the second connector.

17. The method of claim 15, wherein the step of inserting the card through the opening includes sliding the card along the guide.

18. A computer system comprising:
a chassis having a plurality of walls and forming an opening extending in a first direction and configured for insertion of a removable card into the chassis;
a cavity at least partially formed by the chassis and facing in a second direction perpendicular to the first direction;
a removable card supported within the chassis and having a surface facing the cavity, the removable card including at least one component extending from the surface and at least partially extending into the cavity, wherein the removable card moves between a first position in which the at least one component is at least partially received within the cavity and a second position in which the at least one component is removed from the cavity, wherein the removable card linearly translates between the first position and the second position along a first line in a first direction;
a printed circuit board at least partially forming the cavity;
a connector affixed to the printed circuit board facing an the opening, wherein at least a portion of the connector extends within the cavity; and
a guide configured to slidably receive the removable card, wherein the guide extends adjacent the cavity, wherein the guide is linearly movable relative to the chassis for movement to a loading/unloading position in which the guide is spaced from an edge of the opening by a distance greater than a maximum height of the at least one component of the card.

19. A card cage for a computer system, the card cage comprising:
a plurality of walls at least partially forming a cavity facing in a first direction and forming an opening through one of the plurality of walls and facing in a second direction perpendicular to the first direction;
a guide, at least a portion of which is movably coupled to the plurality of walls so as to be linearly translatable relative to the plurality of walls, wherein the guide is configured to slidably receive a removable card having at least one component extending from a printed circuit board and wherein the guide is movable between a first position that permits insertion of the card through the opening or removal of the card through the opening and a second position in which the guide is adapted to support the card with the at least one component at least partially extending into the cavity while the card is completely within the card cage, wherein the guide is further configured to slidably guide movement of the removable card in the second direction while in the second position.

20. The card cage of claim 19, wherein the computer system includes a backplane having a first connector, wherein the card has a second connector and wherein the guide is adapted to guide movement of the card to connect the first connector and the second connector while in the second position.

21. A computer system comprising:
a chassis having a cavity;
a first printed circuit board having a first surface facing the cavity; and
at least one component extending from the first surface, wherein the first printed circuit board moves between a first position in which the at least one component is at least partially received within the cavity and a second position in which the at least one component is removed from the cavity, wherein the first printed circuit board linearly translates between the first position and the second position along a first line in a first direction; and
a guide supporting the first printed circuit board, wherein the guide linearly translates in the first direction, wherein the guide is configured to guide movement of the first printed circuit board in a second direction perpendicular to the first direction, wherein the at least one component includes a secondary card.

22. The system of claim 21, wherein the at least one secondary card includes at least one memory card.

* * * * *

UNITED STATES PATENT AND TRADEMARK OFFICE
CERTIFICATE OF CORRECTION

PATENT NO. : 7,453,701 B2  
APPLICATION NO. : 11/205715  
DATED : November 18, 2008  
INVENTOR(S) : Stephan K. Barsun et al.

It is certified that error appears in the above-identified patent and that said Letters Patent is hereby corrected as shown below:

In column 11, line 25, in Claim 18, after "facing" delete "an".

Signed and Sealed this

Seventh Day of April, 2009

JOHN DOLL  
*Acting Director of the United States Patent and Trademark Office*